US006988895B1

(12) United States Patent
Lamarche et al.

(10) Patent No.: US 6,988,895 B1
(45) Date of Patent: Jan. 24, 2006

(54) ELECTRONIC TEST ITEM DISPLAY AS AN IMAGE WITH OVERLAY CONTROLS

(75) Inventors: Wesley Everett Lamarche, Iowa City, IA (US); Ralph P. Lano, Munich (DE)

(73) Assignee: NCS Pearson, Inc., Eden Prairie, MN (US)

( * ) Notice: Subject to any disclaimer, the term of this patent is extended or adjusted under 35 U.S.C. 154(b) by 522 days.

(21) Appl. No.: 09/759,994

(22) Filed: Jan. 12, 2001

(51) Int. Cl.
G09B 7/00 (2006.01)
(52) U.S. Cl. .................................. 434/323; 715/786
(58) Field of Classification Search ................ 434/322, 434/323, 353, 354, 356, 357, 359, 362, 364, 434/118; 345/786, 788, 764, 762, 705, 797, 345/684, 784, 682, 688, 3.3, 3.4, 785, 787, 345/833, 720, 722; 707/201, 104.1
See application file for complete search history.

(56) References Cited

U.S. PATENT DOCUMENTS

| 4,486,180 | A | | 12/1984 | Riley |
| 5,011,413 | A | * | 4/1991 | Ferris et al. ............ 434/358 X |
| 5,176,520 | A | | 1/1993 | Hamilton |
| 5,195,033 | A | | 3/1993 | Samph et al. |
| 5,204,813 | A | | 4/1993 | Samph et al. |
| 5,211,564 | A | | 5/1993 | Martinez et al. |
| 5,259,766 | A | | 11/1993 | Sack et al. |
| 5,321,611 | A | * | 6/1994 | Clark et al. ............ 434/353 X |
| 5,565,316 | A | | 10/1996 | Kershaw et al. |
| 5,672,060 | A | | 9/1997 | Poor |
| 5,690,497 | A | | 11/1997 | Clark et al. |
| 5,709,551 | A | | 1/1998 | Clark et al. |
| 5,716,213 | A | | 2/1998 | Clark et al. |
| 5,718,591 | A | | 2/1998 | Clark et al. |
| 5,735,694 | A | | 4/1998 | Clark et al. |
| 5,752,836 | A | | 5/1998 | Clark et al. |
| 5,915,973 | A | | 6/1999 | Hoehn-Saric et al. |
| 5,947,747 | A | | 9/1999 | Walker et al. |
| 5,987,149 | A | | 11/1999 | Poor |
| 5,987,302 | A | | 11/1999 | Driscoll et al. |
| 5,991,595 | A | | 11/1999 | Romano et al. |
| 6,146,148 | A | | 11/2000 | Stuppy |
| 6,157,921 | A | | 12/2000 | Barnhill |
| 6,169,546 | B1 | * | 1/2001 | Bogdan .................. 345/339 X |
| 6,173,154 | B1 | * | 1/2001 | Kucinski et al. ......... 434/359 X |

(Continued)

FOREIGN PATENT DOCUMENTS

GB          2 274 932 A      8/1994

(Continued)

OTHER PUBLICATIONS

"'Score Image' Processing of Constructed-Responses, Essays, and Writing Samples", UNISCORE, Incorporated, 3 pages (1992).

(Continued)

Primary Examiner—Chanda L. Harris
(74) Attorney, Agent, or Firm—Merchant & Gould P.C.

(57) ABSTRACT

A method for electronically displaying a test item in a consistent manner for a plurality of workstation configurations. Test content is stored in a memory system and includes at least a question portion and a response portion. A portion of the test content is captured in a test item image. The test item image is overlaid with a response control. Together, the test item image and response control define a test item. The test item is presented to a respondent at a first workstation. An electronic response may be received from the respondent. The test item may appear in a consistent manner when presented on a plurality of workstation configurations, for example, on display devices with different screen resolutions.

23 Claims, 11 Drawing Sheets

U.S. PATENT DOCUMENTS

| | | | |
|---|---|---|---|
| 6,175,841 B1 * | 1/2001 | Loiacono | 707/512 X |
| 6,268,855 B1 * | 7/2001 | Mairs et al. | 345/784 |
| 6,297,837 B1 * | 10/2001 | Bogdan | 345/801 X |
| 6,515,678 B1 * | 2/2003 | Boger | 345/660 |
| 6,556,724 B1 * | 4/2003 | Chang et al. | 382/299 |

FOREIGN PATENT DOCUMENTS

| JP | HEI 4-147288 | 5/1992 |
|---|---|---|
| WO | WO 99/06930 | 2/1999 |

OTHER PUBLICATIONS

"EdLAN: because in education, information should be shared", *IBMEducation Local Area Network and Tools*, 15 pagaes (1991).

* cited by examiner

ELECTRONIC TEST ITEM DISPLAY AS AN IMAGE WITH OVERLAY CONTROLS

BACKGROUND OF THE INVENTION

Computerized testing involves presentation of test content to a test taker and gathering of responses to the test content from the test taker. The test content typically includes a series of test items that are presented to a test taker at a workstation. The test content is typically presented on a display device and the test taker is prompted to enter a response using a keyboard, mouse, touch-sensitive screen or other input device.

Computerized testing is a particularly advantageous tool in standardized testing. When administering a standardized test, it is desirable to attain uniformity of test presentation and testing environment among all test takers. Variations in environmental factors and test presentation may prejudice particular test takers and distort standardized test results. Therefore, consideration must be given to factors that generate variations in test item presentation.

Differences in computer system hardware can vary the appearance of test items presented to the test taker. Hardware factors include display screen resolution and display screen size. Variations may also arise when test content is presented in different operating system environments. A test taker working on a MACINTOSH® computer, for example, may be disadvantaged against a test taker working on a WINDOWS®-based machine. Because of variations in the operating software, a test designed for presentation in a WINDOWS® environment may appear differently and therefore be less readily comprehensible when presented on a MACINTOSH® machine.

Other software factors can generate variations in test item presentation. For example, window-scrolling variations may disadvantage test takers who must scroll up and/or down to comprehend and analyze test content. Misalignment of test content may also disadvantage particular test takers. For example, variations in text wrap-around behavior may disadvantage certain test takers who are presented with poorly organized or less readable text. Improved methods of uniformly presenting computerized test content are needed.

SUMMARY OF THE INVENTION

The present disclosure is directed generally to methods of displaying a test item to a respondent at a workstation. More particularly, the present disclosure is directed to a method of displaying a test item in a consistent manner for a plurality of workstation configurations.

Test content is stored in a memory system. The test content includes at least a question portion and a response portion. A portion of the test content is captured in a test item image. A response control is overlaid on the test item image. Together, the test item image and response control define a test item. The response control may include at least one device for selecting one of a plurality of response options. The response control may be selected from a group consisting of a radio box, a check box, a text box, an electronic drawing box, a drop and drag overlay, and a hot spot overlay.

The test item is presented to a respondent at a workstation. The test item permits the respondent to electronically generate a response from the test item. The electronically generated response may be received from the respondent through the workstation.

The step of capturing test item images may be performed by capturing the test item from an electronic file. Alternatively, the step of capturing may be performed by printing the test content and then electronically scanning the test content. The stored test content may include text and/or an illustration, and may include a question portion and a response portion, along with an illustration portion in some embodiments. In one embodiment, a plurality of question portions and response portions may be captured in a single test item image.

A navigation control may be overlaid on the test item image. Navigation controls enable the respondent to navigate forward or backward to other test items. A positionable graphic tool overlay may also be overlaid on the test item image. A graphic tool overlay provides a graphic such as a measurement tool that the test taker can manipulate to assist with responding to a test item.

In another embodiment of the method, a test item is presented in a consistent manner for a plurality of different system configurations. A test item is displayed on a plurality of workstations having a plurality of different display resolutions. A question portion is displayed in an image format to provide uniform appearance on the plurality of displays. The same amount of scrolling is required to view the image formats despite the different display resolutions. A response control is overlaid on the image. A navigation control or a graphic may also be overlaid on the question portion.

Another embodiment is a method for electronically displaying a test item to a respondent in a consistent manner on a first workstation display configuration and at least one other workstation display configuration different than the configuration of the first workstation. A first test item includes an image of a graphic question portion and an overlaid response control. The first test item is displayed on a first display device having a first resolution. The first test item is also displayed on a second display having a second resolution larger than the first resolution. The same number of pixels is used to display the test item on the first display and the second display. The test item may also require the same amount of scrolling on the first display and the second display. The test item may also appear the same size on the first display and the second display.

Another embodiment includes a method for electronically displaying a test item to a respondent at a workstation in a consistent manner for a plurality of different workstation configurations. An image has at least a question portion and a response portion. A response control is overlaid over the image to form a test item. The test item is displayed to a first respondent at a first workstation having a first display with a first resolution. The test item is also displayed on a second workstation having a second display with a second resolution. Although the first resolution is higher than the second resolution, the same amount of scrolling is required to view the test item on the first display and the second display. The first display and second display may include the same viewing area. In addition, the test item may appear the same size on the first display and the second display.

The response control may include at least one device for generating an objective response by selecting one of a plurality of response options. The response control may be selected from a group consisting of a radio box, a check box, a text box, an electronic drawing box, a drop and drag overlay, and a hot spot overlay. A navigation control may also be overlaid over the test item image to enable the respondent to navigate forward or backward to other test items. A graphic may also be overlaid over a portion of the test item. The graphic may be a graphic tool selected from a group consisting of a ruler and a protractor.

BRIEF DESCRIPTION OF THE DRAWINGS

The invention may be more completely understood by considering the detailed description of various embodiments of the invention which follows in connection with the accompanying drawings.

Figure 1:
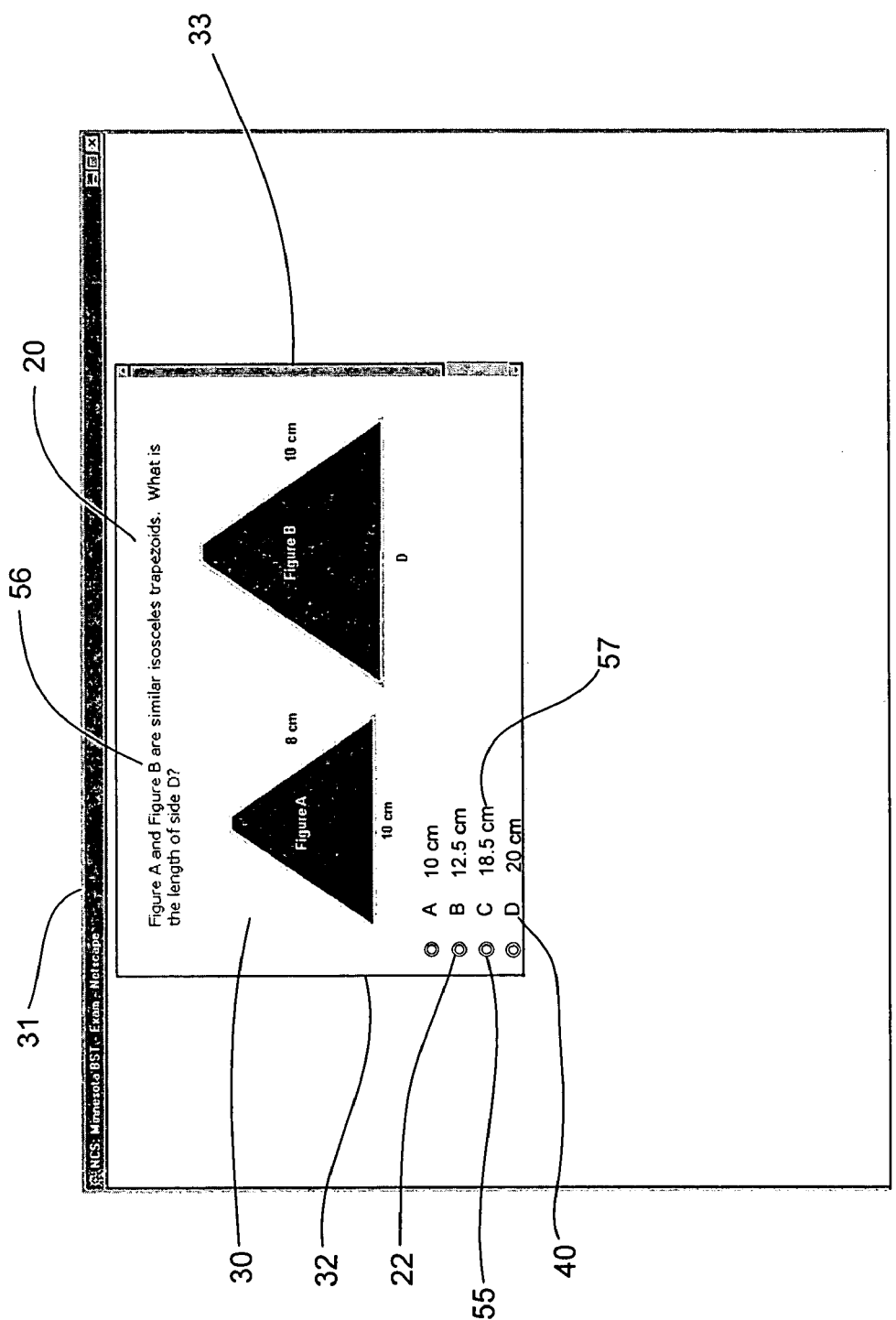
FIG. 1 is an illustration of a test item presented in a test window.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENT

The present disclosure is directed generally to methods of computerized testing. More particularly, the present disclosure is directed to methods for electronically displaying a test item to a respondent at a workstation.

The present method and system permits a test item to be presented on various display configurations in a consistent manner. While some parameters (such as test item size in inches on a display) may vary, the present method ensures that many parameters such as the amount of scrolling, if any, required to view the entire test item, text alignment and text wrapping do not vary across a variety of display configurations.

Now referring to FIG. 1, the administration of a computerized test includes presentation of a series of test items to a test taker. Each test item 20 includes test content for one or more test questions. A test question typically presents a test taker with test content information and prompts the test taker to enter a response. In the present system, test content is captured in a test item image 30. An image such as a test item image is data representing visual information. The image is defined by data assignments to data points or pixels. The data assignments may include information such as color or brightness. The image may be stored in a raster format such as a TIFF, PNG, JPEG, GIF, or BMP file. A vector format may also be used, such as DXF or DWG, where the format is made up of commands to draw lines, arcs, etc. to create the desired visual image. A raster format is preferred. With a vector format, the display device must translate commands into the final visual image. Therefore a stronger certainty of consistency in the final visual display is achieved with a raster format. A response control 22 is overlaid on the test item image 30. A navigation control 23 (shown in FIGS. 2 and 3) or graphic overlay 25 (shown in FIGS. 6 and 7) may also be overlaid on the captured test item image 30. Capturing test content in a test item image tends to compensate for variations in the user interface. As a result, the technique provides more uniform test item presentation across a variety of hardware and software system configurations. In addition, grouping all components of one or more test items may also conserve bandwidth during transmission of the test item.

As shown in FIG. 1, a test item 20 is presented in a test window 31. A portion of the test window 31 is occupied by a test item panel 32. At least a portion of a test item 20 is visible through the test item panel 32. The test item panel 32 may include a scroll bar 33 on the side of the panel. The scroll bar may be used to scroll through the test item panel 32 to view the rest of the test item 20.

Figure 2:
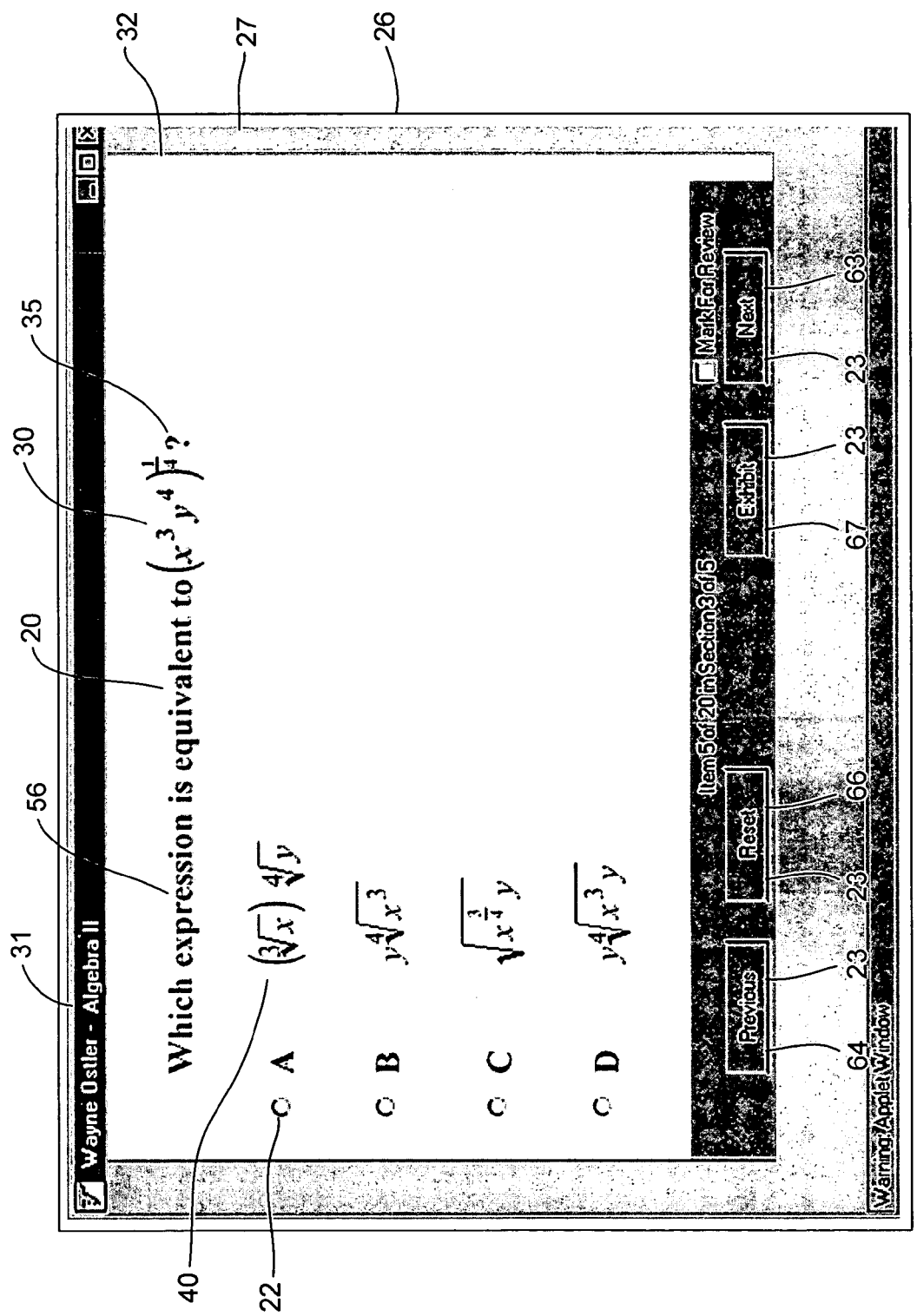
FIG. 2 is an illustration of a display device having a test item displayed in the display device viewing area.
Figure 3:
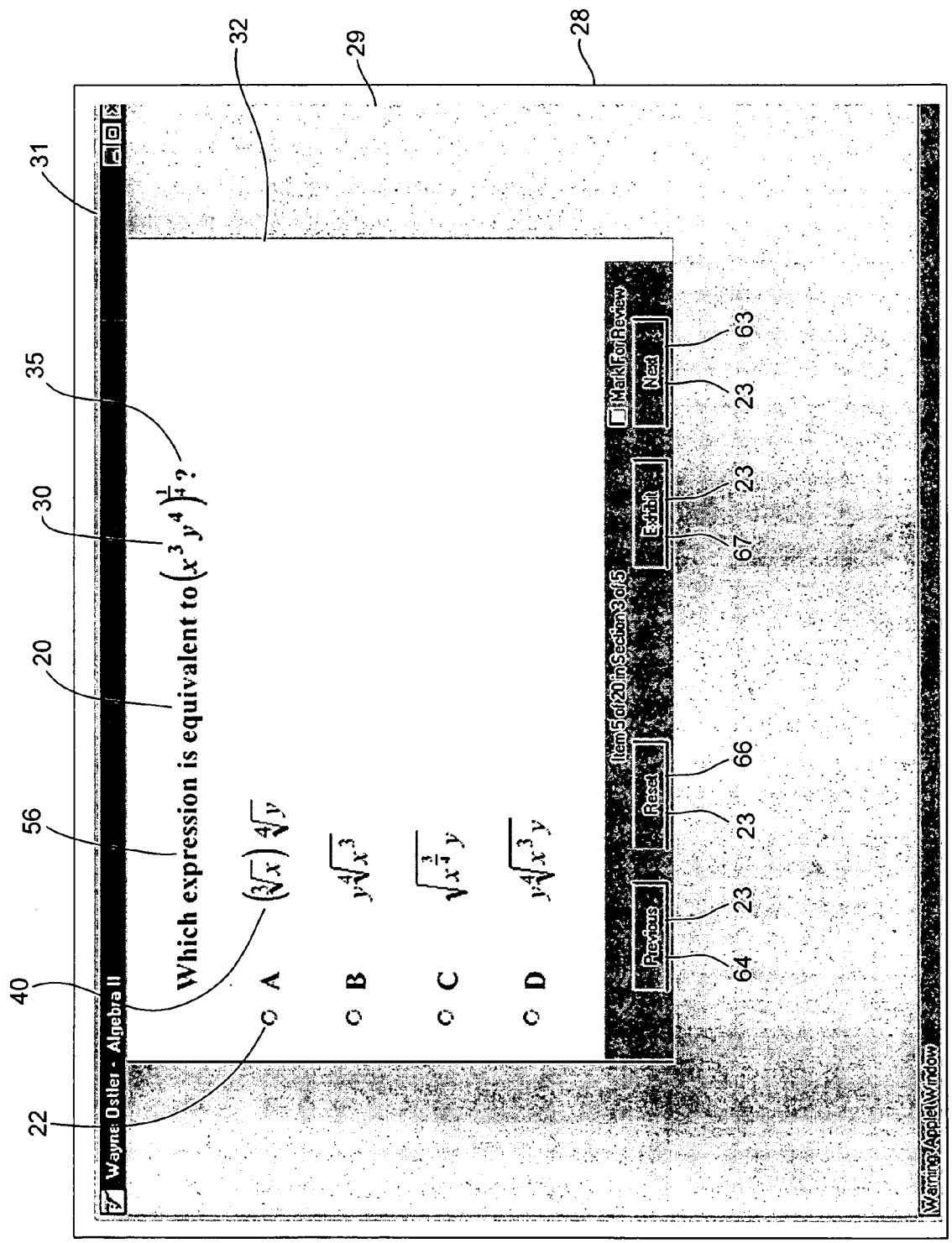
FIG. 3 is an illustration of a test item presented on a display device having a viewing area larger than the viewing area of the display device shown in FIG. 2.

Referring now to FIGS. 2 and 3, the test item 20 is displayed on a first display device 26 (FIG. 2) having a first resolution or a second display device 28 (FIG. 3) having a second resolution. Resolution for a display device is a measure of how much information can be displayed at one time on the device. For a cathode ray tube (CRT) computer monitor, resolution is measured in pixels (horizontal×vertical). Where a resolution is described as larger or higher herein, it is meant that the resolution has a larger value for either the horizontal or vertical measurement. A higher resolution allows more information to fit on a screen. Each test has a minimum resolution, referred to here as the target resolution, at which it may be displayed. The resolution of each test panel is equal to the target resolution.

Viewing area is the portion of a display screen that is available for displaying information to a viewer. The viewing area of a screen with a given resolution will depend on the pixel pitch. Pitch refers to the spacing between adjacent pixels. For a display device with a given resolution, a display device with a smaller pitch will have a smaller viewing area. Stated differently, a first display device with a larger viewing area than a second display will present more pixels and information, assuming that both displays have the same pixel pitch.

In the example illustrated in FIGS. 2 and 3, the target resolution has been set to be equal to the resolution of display device 26 of FIG. 2. Therefore, a test item panel 32 will occupy all available space in a test item window 31 so as to fill the entire screen. The display device 28 of FIG. 3 has a larger resolution for both the horizontal and vertical values, so the test item panel 32 does not fill the entire display area 29 in either direction. In this example, the display device 26 of FIG. 2 may have a resolution of 640×480 while the larger display device 28 of FIG. 3 may have a resolution of 800×600.

When a test item is presented on display devices having different resolutions and/or display viewing areas, the same number of pixels may be used to display the test items on each display. Referring to FIG. 2, a test item 20 is presented in (i.e. visible through) a test 31 panel 32 on the first display device 26 with a display area 27 and a first display resolution. FIG. 3 shows a test item presented in a test panel 32 on a second display device 28 having a larger display area 29 and a higher screen resolution. Despite the fact that the second display device has a larger viewing area and larger screen resolution than the first display device, the test item panel 32 will have the same dimensions in pixels. In other words, the same amount of test item panel 32 space is used to display the test item 20.

Some test items will not require any scrolling, as shown in FIGS. 2 and 3. The test item 20 of FIGS. 2 and 3 prompts the test taker to determine which of a plurality of choices is equivalent to a given mathematical expression. No illustration is presented. The entire test item fits in the test item panel 32, and, as a result, no scrolling is required.

Other test items will require scrolling to view portions of the test item. For example, the test items shown in FIGS. 1, 6, 7, and 8 require scrolling to see a hidden bottom portion of the test item. One typical scrolling device is the scroll bar 33 shown in FIGS. 1, 6, 7, and 8. When a test item requires scrolling, the same amount of scrolling may be required for various display configurations regardless of the resolution of the displays because the same number of pixels is visible through the test item panel and the same number of pixels is used to display the image within the test item panel across all display configurations. In contrast, when test content is presented in a character-based text format, a higher resolution display typically fits more characters in the viewing area, so that less scrolling is required on a higher resolution display than on a lower resolution display, unless special scaling steps are taken.

A test item may include text, equations, graphs, diagrams, and other features. A test item may also include undisplayed information such as information concerning the correct answer or answers to the test item.

Pictorial information, such as a graph, may be provided in the question portion of a test item or in the response portion, or in a separate portion. For example, a test question may ask a test taker to determine the slope of a line on a graph and select the correct slope from a list of responses. Alternatively, a test question may present the test taker with a given slope and ask the test taker to identify which of a plurality of graphs depicts a line with the given slope. FIG. 1 provides another example of a test question. In the test question of FIG. 1, the test taker is presented with an image of two similar trapezoids. The test taker is given the length of two sides of the trapezoid in FIG. A and one side of the trapezoid in FIG. B and is asked to determine the length (D) of a second side of the trapezoid of FIG. B.

Figure 4:
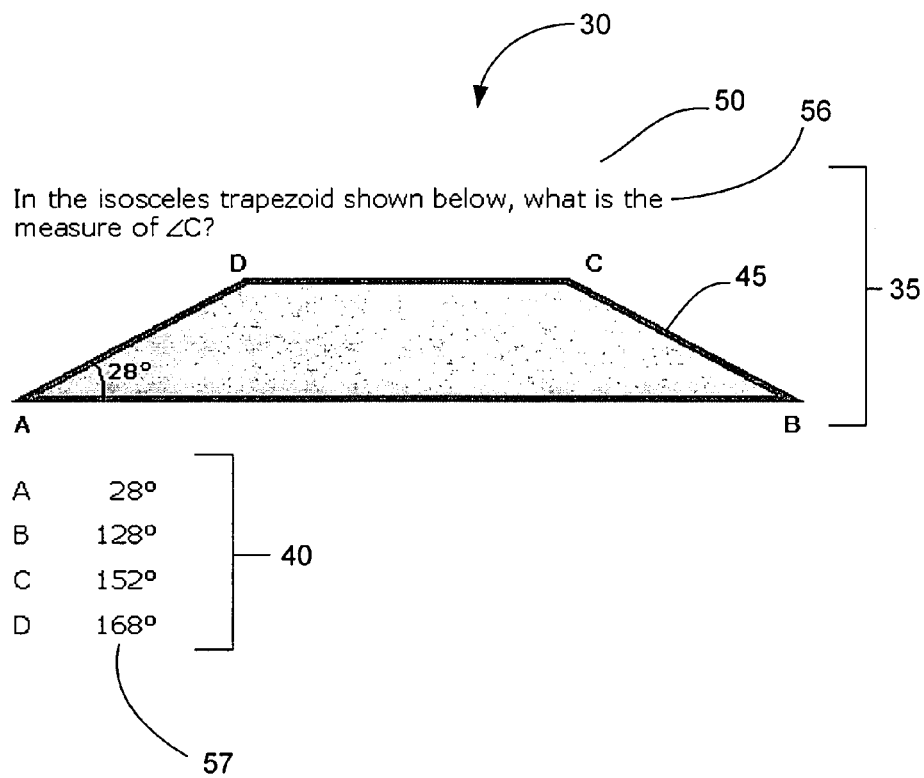
FIG. 4 is an illustration of a test item image having a question portion and a response portion.

Referring to FIG. 4, a test item image 30 includes at least a question portion 35 and a response portion 40. The question portion and/or response portion may include an illustration such as a diagram or graph for consideration by the test taker. In FIG. 4, for example, a diagram 45 of a trapezoid is provided in the question portion 35.

The question portion 35 of a test item 20 typically includes at least a text portion 50 that presents a question for consideration by the test taker. In FIG. 4, for example, the question portion 35 prompts the test taker to determine the measure of angle A as illustrated in the trapezoid provided in the test item image.

Many different types of response portions 40 may be used in testing, including both objective and subjective responses. Objective responses typically ask a test taker to choose from among answers provided, while subjective responses require the test taker to compose an answer. Combined subjective and objective responses are also possible.

One common type of objective response is a multiple choice question which includes two or more textual responses for consideration by the test taker. The response portion 40 of FIGS. 4–5 provide an example of this type of objective response, where the response portion of the test item image includes four choices consisting of the angle measurements labeled A, B, C, and D.

Figure 5:
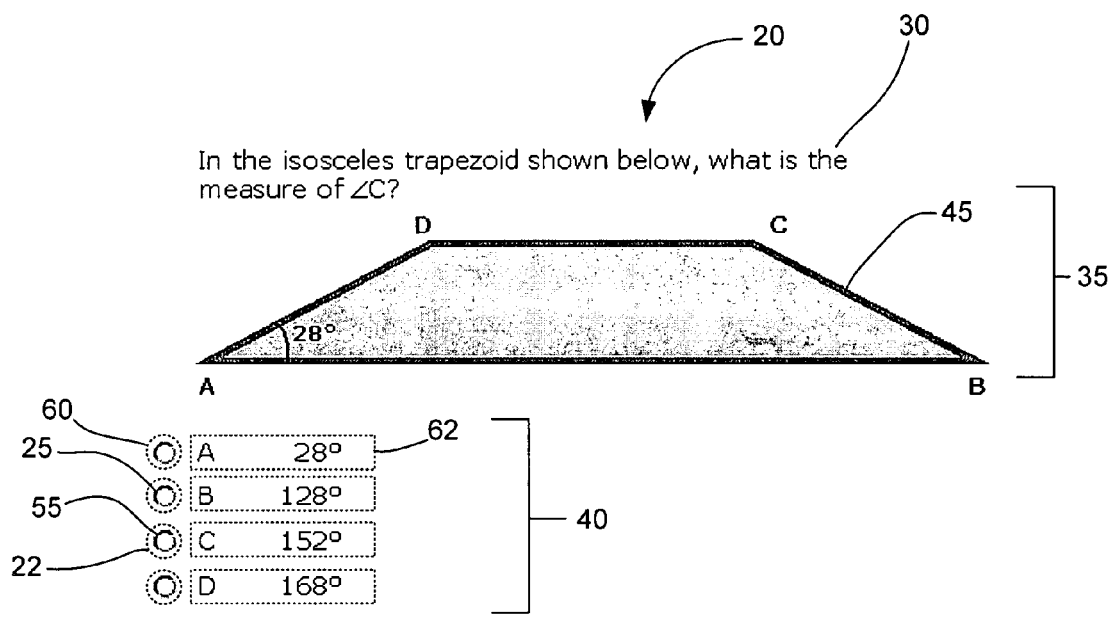
FIG. 5 is an illustration of a test item including the test item image of FIG. 4 and overlaid response controls.

A multiple-choice question such as the test item shown in FIGS. 4–5 typically includes an item stem 56 and distracters 57. The item stem 56 is the question itself that prompts the test taker to select among the available choices. An item distracter 57 is an incorrect response option that may distract a test taker from the correct response because the incorrect response is visually similar to correct response. It is often desirable for the item distractors or response options to align in a particular way when the test item is presented to the test takers, such as vertical alignment by decimal point for math-type responses. This alignment is more easily achieved using the present system.

Many varieties of responses controls are available. Response controls 22 permit receipt of a test item response from the test taker. A response may be received, for example, through a traditional graphical user interface (GUI) control such as radio buttons 55 or check boxes. FIG. 5 shows a GUI control overlaid on the test item image 30. In FIG. 5, a set of radio buttons 55 is placed to the left of the response labels A, B, C, and D.

Figure 12:
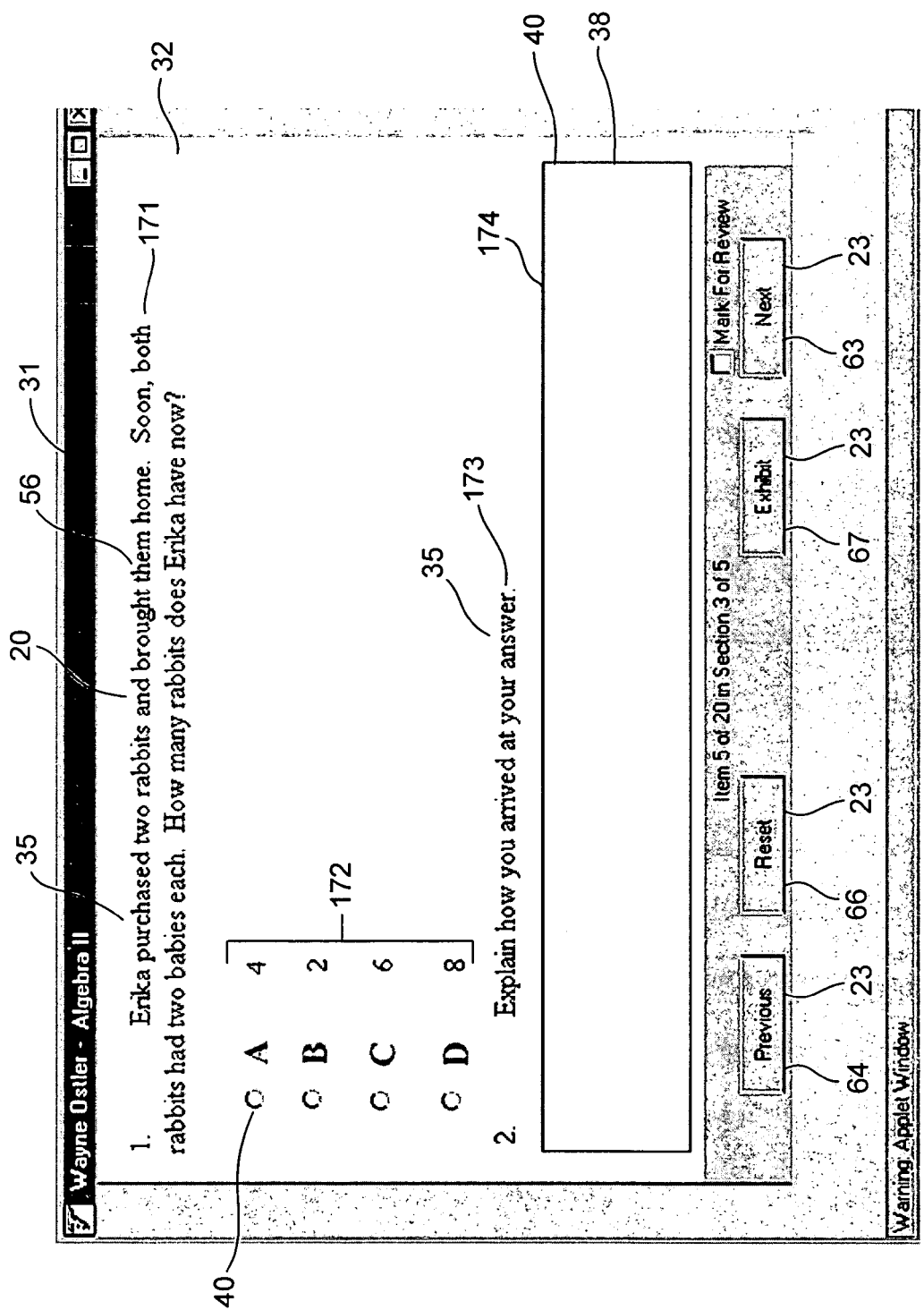
FIG. 12 is an illustration of a test item window with a test item including two question portions and two response portions.

Other examples of response controls include check boxes, a text box, drawings controls, graph controls, a drop and drag item, and hot-spot selection. A set of radio buttons permits a respondent to select one of a plurality of choices, where one radio button corresponds to each choice. A check box permits a respondent to check or uncheck a box. For example, a plurality of check boxes may be used when a respondent is prompted to select one or more of a plurality of responses. A text box 38 permits a respondent to enter a textual response, for example by typing a response on a keyboard as shown in FIG. 12. Where the response control is a text box, the response portion of the test item image may simply be an open area for the text box. For some other types of response controls the response portion of the test item image may not contain any material, such as for drawing boxes.

Drawings tools permit a respondent to use an interface tool such as a mouse to create an image. For example, a test item may prompt a respondent to use a drawing tool to draw a pentagon. Drawing or graphing tools may also be used by a respondent to plot points or lines on a graph. A positionable graphic such as a drag-and-drop item permits the respondent to move an graphic on the screen. For example, a respondent may be prompted to correctly position the liver on a diagram of a human torso. A hot-spot selection tool allows a respondent to mark or select a certain point or points on the test item to indicate an answer. A respondent may use a mouse or positioning keys to indicate the point. For example, a respondent may be asked to indicate the foci of an ellipse.

Some response controls may appear differently on different display devices or operating systems, but still achieve a consistent manner of appearance of the overall test item. For example, radio buttons have a different appearance on WINDOWS® operating systems and MACINTOSH® operating systems. Despite small variations in response control appearance or other factors, the image-based display system provides consistency in the most important test item appearance factors, such as text-wrapping, alignment, and amount of scrolling.

To promote ease of use of the response controls, sensitive areas 60, 62 can be drawn around the controls to support less precise mouse operation. In FIG. 5, dashed-line boxes represent sensitive areas 60, 62 of the test item. The sensitive areas 60, 62 are typically part of the response control overlay. As shown in FIG. 5, a sensitive area 60 can be established around a radio button so that exact positioning of the mouse pointer over the radio button is not required. In addition, a sensitive area 62 may be defined over a portion of the test item image. Selecting a point within the sensitive areas will activate the response control to select a particular response. The dashed lines will typically not appear on the test item as presented to the test taker, and appear in FIG. 5 only to illustrate the sensitive area for receiving a response from the test taker.

Now referring to FIG. 2, the test item 20 may also include a navigational control 23. Navigation controls permit the test taker to navigate backward and forward among test items. As shown in FIG. 2, a test item includes controls labeled "Next" 63 and "Previous" 64. Selecting the "next" button lets the test taker proceed forward in the test to the next test item and selecting the "previous" button lets the test taker navigate backward in the test to a previous test item. A control may also be provided to navigate the test taker to the beginning or end of a section of the test. In addition, FIG. 2 shows buttons labeled "reset" 66 and "exhibit" 67. Selecting the "reset" button 66 will restore the test item response control to its initial state, for example, where no buttons are selected, no text is entered in a text box, or a drag-and-drop item is in its original position. Selecting the "exhibit" button 67 will navigate the test taker to a window that provides supplementary or reference material such as a formula sheet, calculator, or periodic table.

Figure 6:
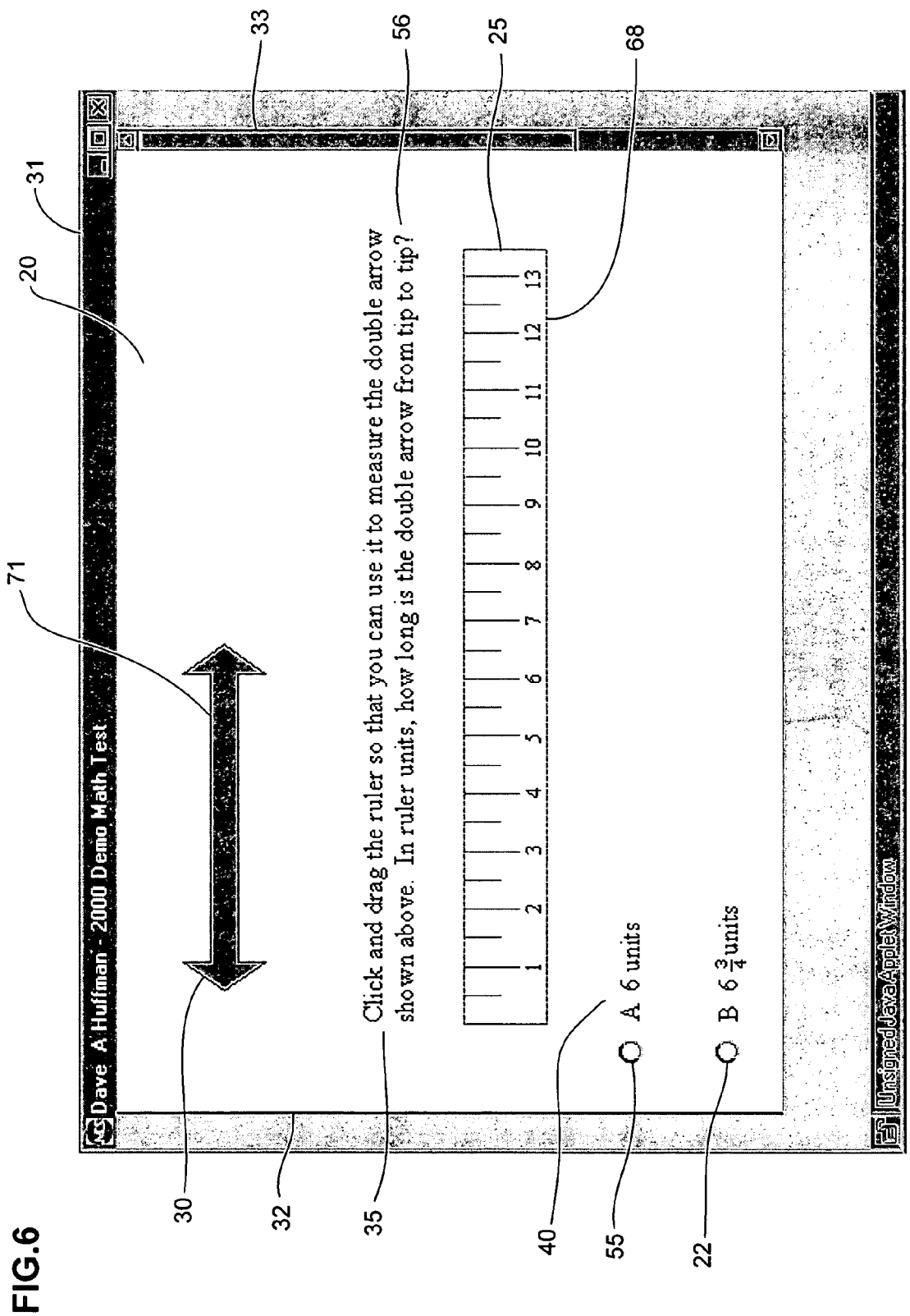
FIG. 6 is an illustration of a test item including an overlaid ruler.
Figure 7:
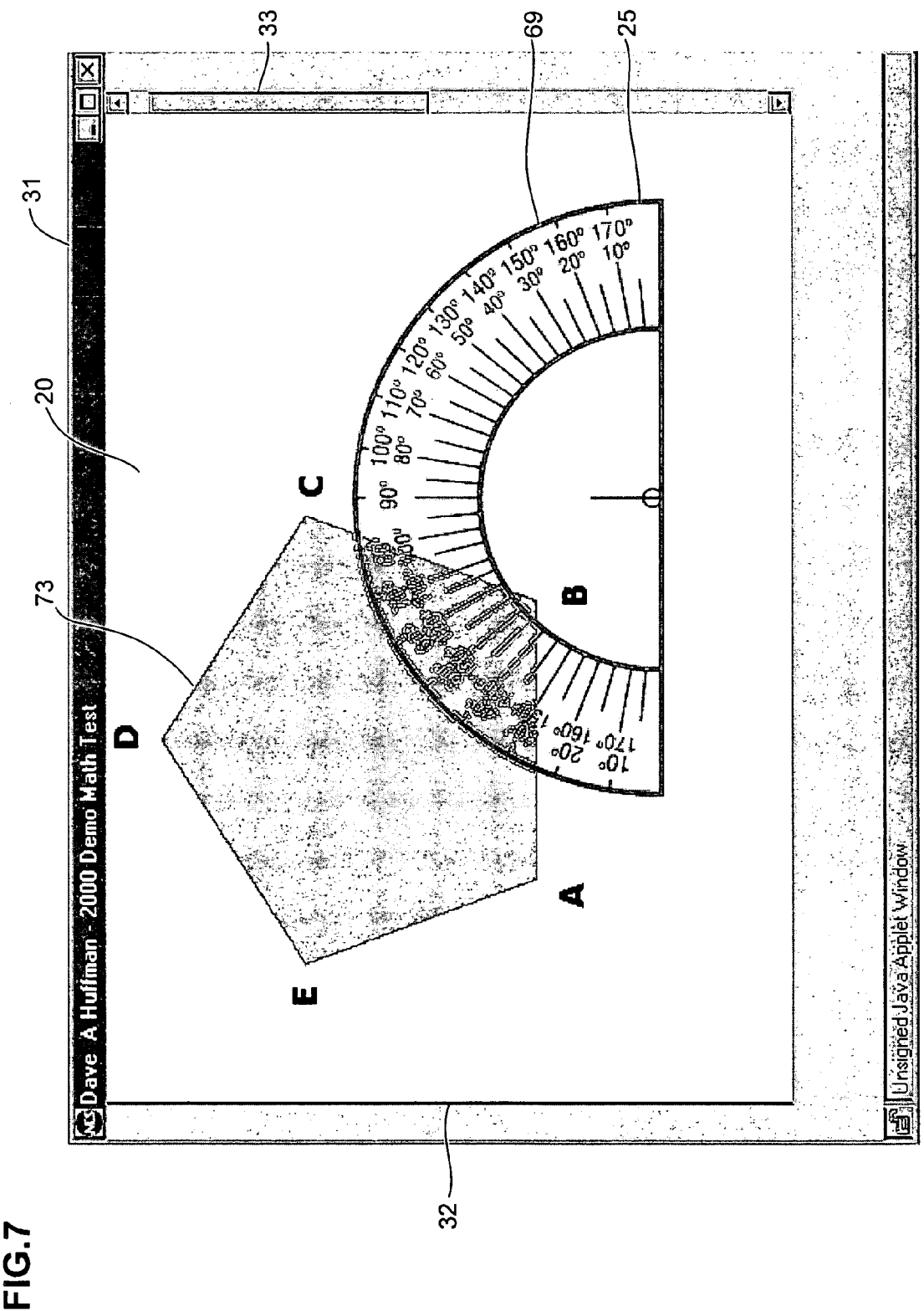
FIG. 7 is an illustration of a test item including an overlaid protractor.

Now referring to FIGS. 6 and 7, the test item 20 may also include a graphic overlay 25 that is used as a tool. Because the image size and aspect ratio are controlled by the pixel-based definition of the test item image, a graphic tool can be overlaid on the image for measuring portions of the image. Where image size and aspect ratio are not consistent for different display devices, measuring tool overlay could not reliably be used as a part of a test item, because the relative size of the tool overlay and the test item image might not be predictable. As shown in FIGS. 6 and 7, a graphic such as a ruler 68 or protractor 69 is overlaid on the test item. The test taker may manipulate the graphic using an input device such as a mouse. In FIG. 6, for example, a ruler graphic is overlaid on a test item image. The test taker may move the ruler 68 over the double arrow 71 to measure the length of the arrow from tip to tip. In FIG. 7, a protractor graphic 69 is overlaid on a test item image. The test taker may reposition the protractor 69 to measure an angle of the pentagon 73.

Figure 8:
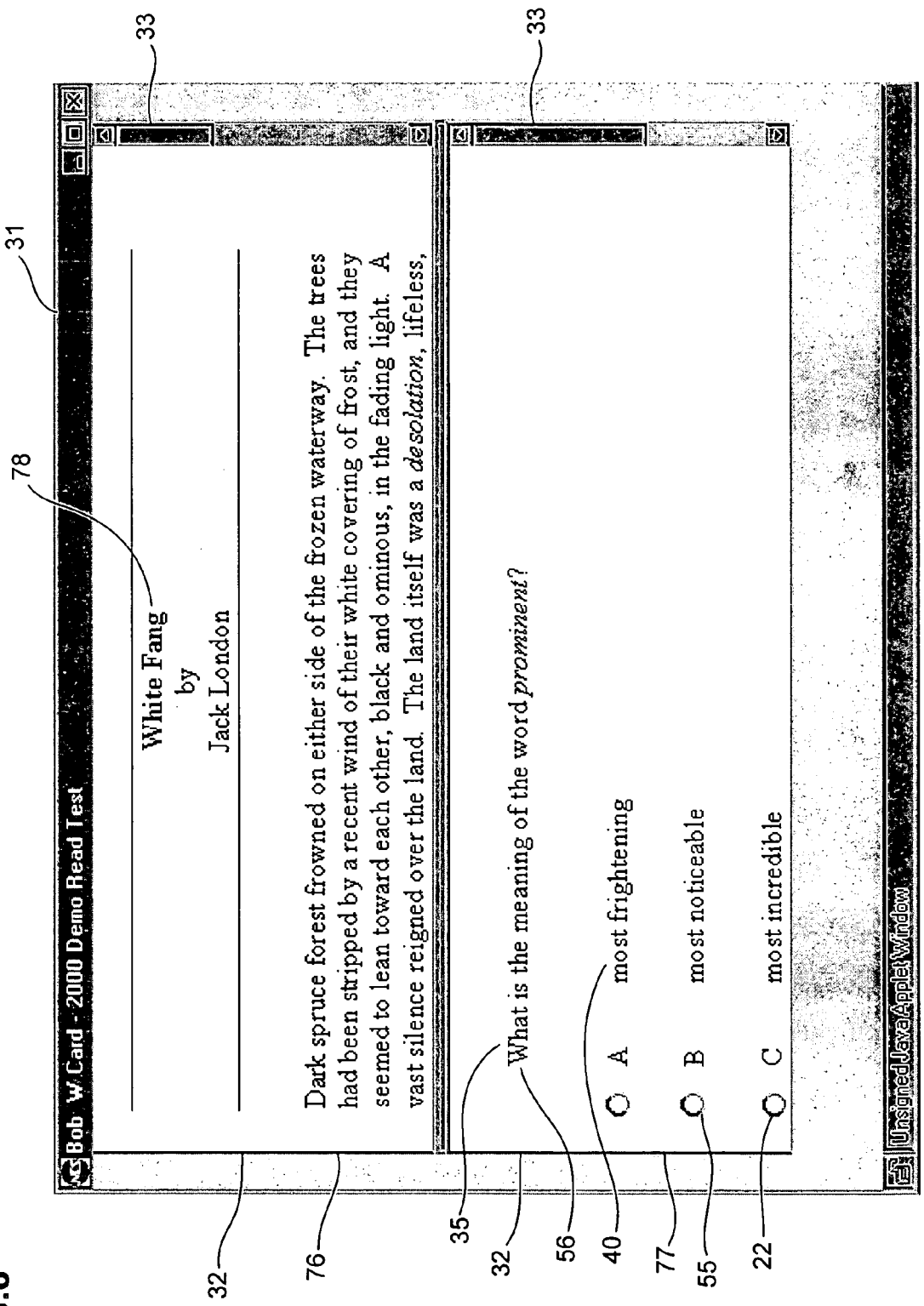
FIG. 8 is an illustration of a test item window with a panel providing a supplementary reading passage.

Referring now to FIG. 8, a test item window may include more than one panel. In FIG. 8, for example, a top panel 76 presents supplementary material, in this case a reading passage 78. A bottom panel 77 presents a test item including a multiple choice test question that refers to the reading passage 78. The bottom panel may include a plurality of test questions. As shown in FIG. 14, a test item may include a plurality of test question portions.

Figure 9:
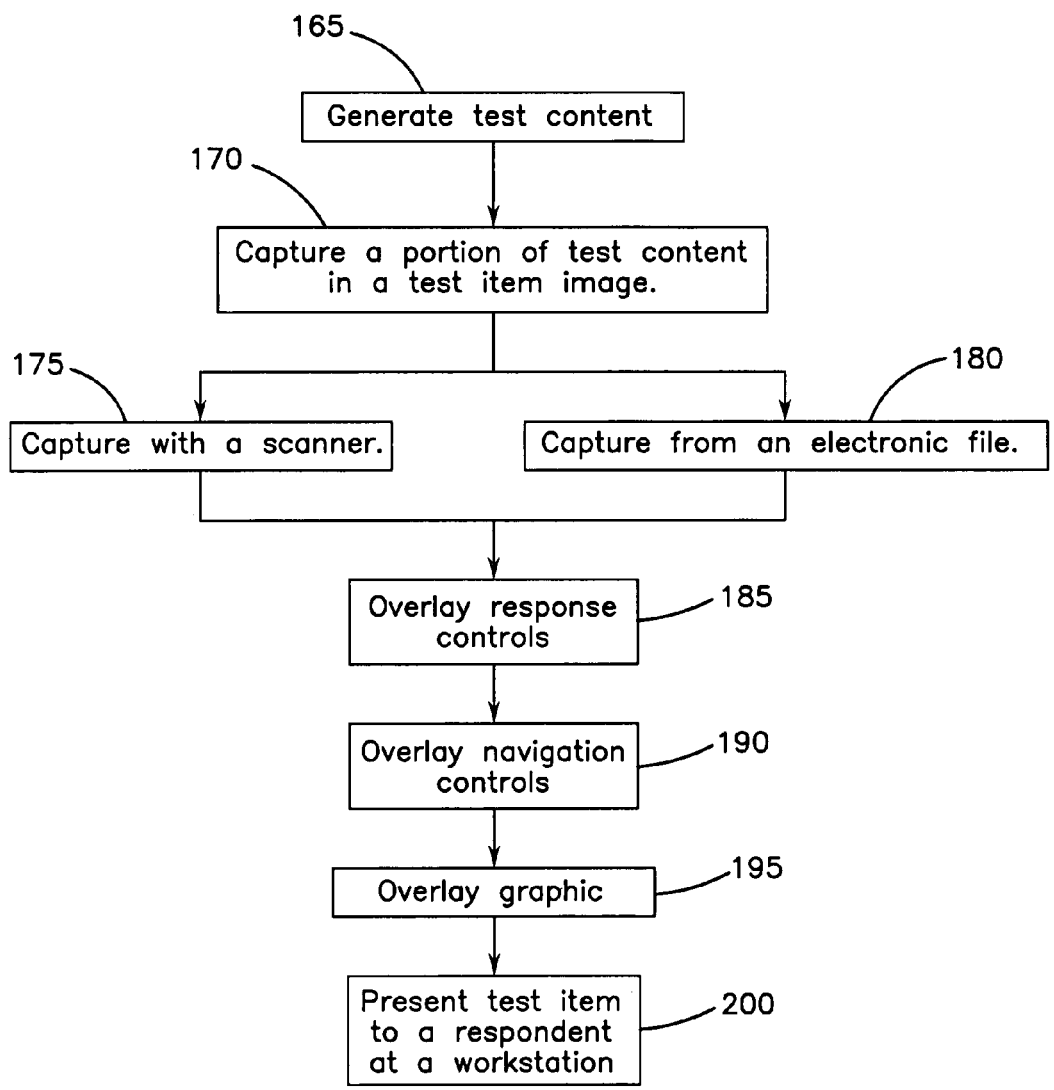
FIG. 9 is a block diagram of a method for electronically displaying a test item to a respondent at a workstation.

A method of generating test items is shown schematically in FIG. 9. As shown in FIG. 9, test content is generated in step 165. Test content may be authored using computer software such as word processing programs, desktop publishing programs and/or electronic drawing programs. Although computer assisted test content authoring is most likely and preferable, it is also possible to manually author content using pen and paper. Using authoring software or other tools, test content including at least a question portion and a response portion is generated. Software is also available and generally known for generating visual or other sensory content such as equations, formulae, graphs, charts, and other illustrations or video.

Referring again to FIG. 9, at least a portion of the test content is captured in a test item image in step 170. The test item image may include a single question and response or a plurality of questions and responses, as shown in FIG. 12. FIG. 12 shows a test item including a first question 171 with a radio-button multiple choice response 172 and a second question 173 with a text-box response 174.

A test item image may also include only a portion of the test item content, such as only a question portion, only a response portion or only an illustration portion. For example, the response portion and question portion could be captured in separate test item images and then presented to the respondent as two test item images. The advantages of consistent appearance are still achieved using this alternative.

Now referring to FIG. 9, if the test content is authored on computer software, the test content may be captured from an electronic file using software such as a frame grabber, as indicated in optional step 180 of FIG. 9. This digital capturing process may be automated. Alternatively, computer authored or manually authored test content may be scanned from paper to capture a digital test item image, as indicated in optional step 175 of FIG. 9.

In step 185, the test item image is overlaid with a response control. The response control may be placed on the test item image using generally known software techniques. As previously discussed, examples of response controls include a radio button, a check box, a text box, drawing tools or a postionable graphic.

In step 190, the test item image may be overlaid with navigation controls. In step 195 the test item image may be overlaid with a graphic tool such as a movable ruler or protractor.

In the preferred embodiment, a test item image, response control overlay and navigation control overlay define a test item, and a graphic tool overlay is included in the test item where appropriate to the question. However, one or more of the overlays may be omitted or combined. For example, the navigation controls may be integrated into the response controls. A test taker can be presented with the next test item immediately after selecting a response, thereby eliminating the need for some navigation controls. Similarly, the overlaid graphic tool may be omitted as in FIG. 2 or may be integrated into the response controls. The test item may also include other information such as information regarding correct answers to test items. This other information may be hidden from the test taker.

To administer a test, one or more test items are presented sequentially to a respondent at a workstation, as indicated in step 200 in FIG. 9. The test items 20 are presented in a test item panel 32, as shown in FIGS. 1–3 and 6–8. Because the test content is stored in an image format, test questions will be presented uniformly on a variety of computer system configurations, despite variations in hardware such as the user interface.

The administration of computerized testing typically involves providing a user terminal or workstation such as a personal computer for presenting the computerized test to a test taker. A user terminal is also the typical and preferred device used for authoring test content and/or capturing the test item image. The user terminal may be a personal computer such as an IBM®, COMPAQ®, DELL®, or APPLE® MACINTOSH® personal computer. The user terminal typically has resident thereon an operating system such as WINDOWS® 95, WINDOWS®98, WINDOWS® ME, WINDOWS NT®, WINDOWS® 2000, MAC OS® 7, MAC OS®8, MAC OS®9 or MAC OS® X software.

Figure 10:
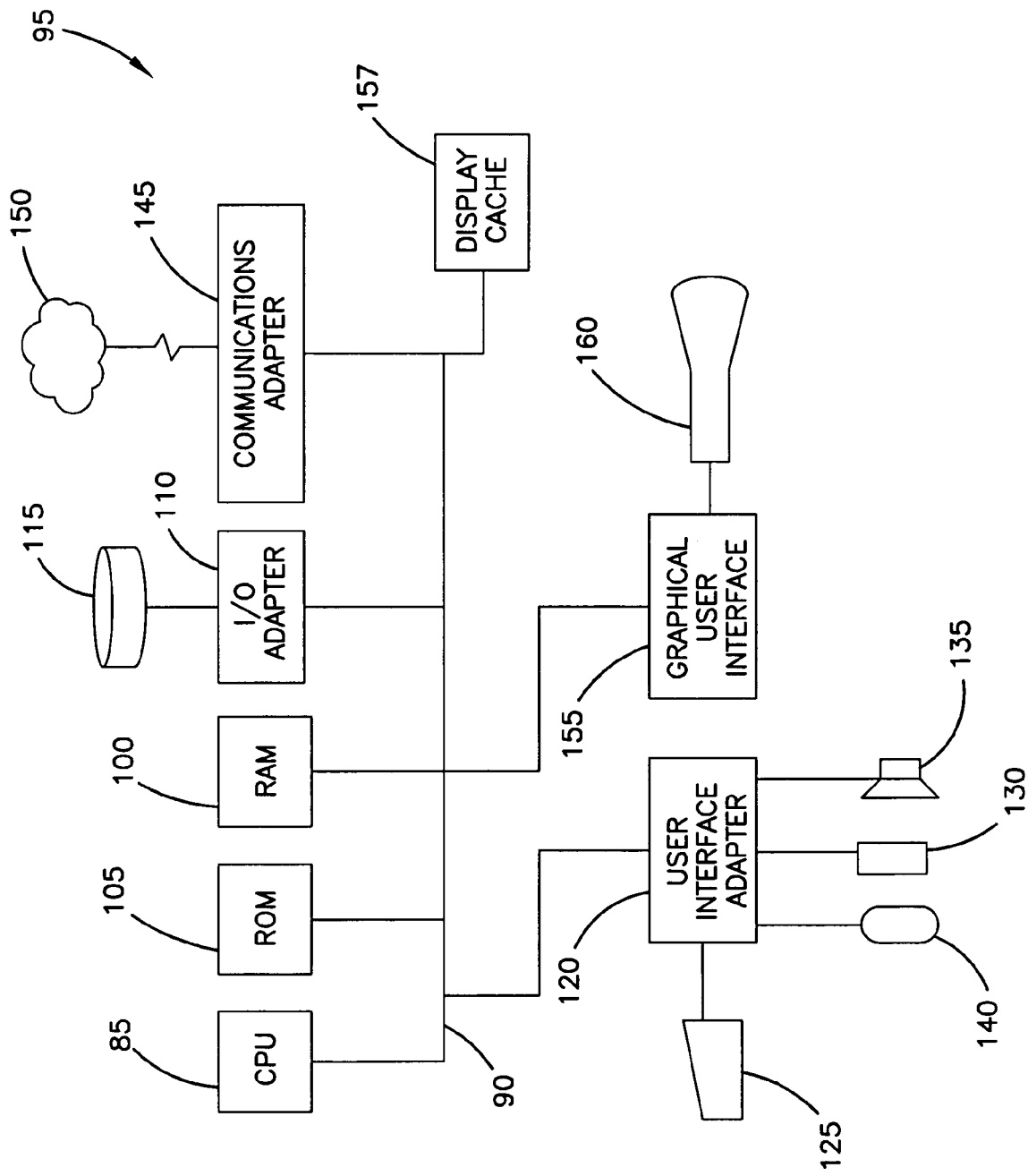
FIG. 10 is a block diagram of a computer system for use with the present system.

An example of a user terminal 95 is shown in FIG. 10. The preferred hardware configuration includes a central processing unit 85, such as a microprocessor, and a number of other units interconnected by, for example, a system bus 90. The computer of a terminal 95 may also be spread out over one or more interconnected computers or computer systems.

The user terminal used to display test items to test takers typically also includes a Random Access Memory (RAM) 100, Read Only Memory (ROM) 105, and an I/O adapter 110 for connecting peripheral devices such as disk storage units 115 to the bus 90. A user interface adapter 120 for connecting several input devices is also included. Examples of possible input devices electronically coupled to the user interface adapter 120 include a keyboard 125, a mouse 130, a speaker 135, a microphone 140, and/or other user interface devices such as a touch screen or voice interface (not shown). A communication adapter 145 is included for connecting the user terminal to a communication network link 150. A graphical user interface 155 is also coupled to the system bus 90 and provides the connection to a display device 160. It will be apparent to those in the art that the mouse 130 may be a typical mouse as known in the industry, a trackball, light pen, or the like. A display cache 157 may also be part of the user terminal. The display cache is shown in FIG. 10 as connected to the system bus 90, but may reside many other places within the user terminal.

Standardized testing may be conducted in a network environment. In a client/server system, each user is provided with a user terminal that may be linked to a modem, communication lines, network lines, a central processor, and databases. A WINDOWS NT® server or UNIX® server, for example, may be used with this system. The user terminal provides the user with a way to view electronic test items stored on the server. The user terminal also provides a way to input responses to test items. The responses may be electronically transmitted to the central server.

The network also typically has a resident operating system, for example, NOVELL® NETWARE® or NOVELL® INTRANETWARE®, among other possibilities. In the preferred environment, the desktop typically has Internet browser software, such as MICROSOFT® Internet Explorer™ or NETSCAPE NAVIGATOR®. In the alternative, the network software operating system may not be available separate from the workstation operating system, and the network operating system may have an integrated Internet browser. Other alternatives for client and server software include ORACLE® software or MICROSOFT® SQL Server™.

Several methods have been used to store test content and deliver test content to a test taker at a workstation. For example, test content may be transferred to each workstation on a portable medium such as a floppy disk or CD-ROM. Alternatively, test content may be stored on a central server and delivered over a network to a client workstation attached to the network. Content may also be delivered over the internet, over optical data lines, by wireless transmission or by other transmission techniques.

Figure 11:
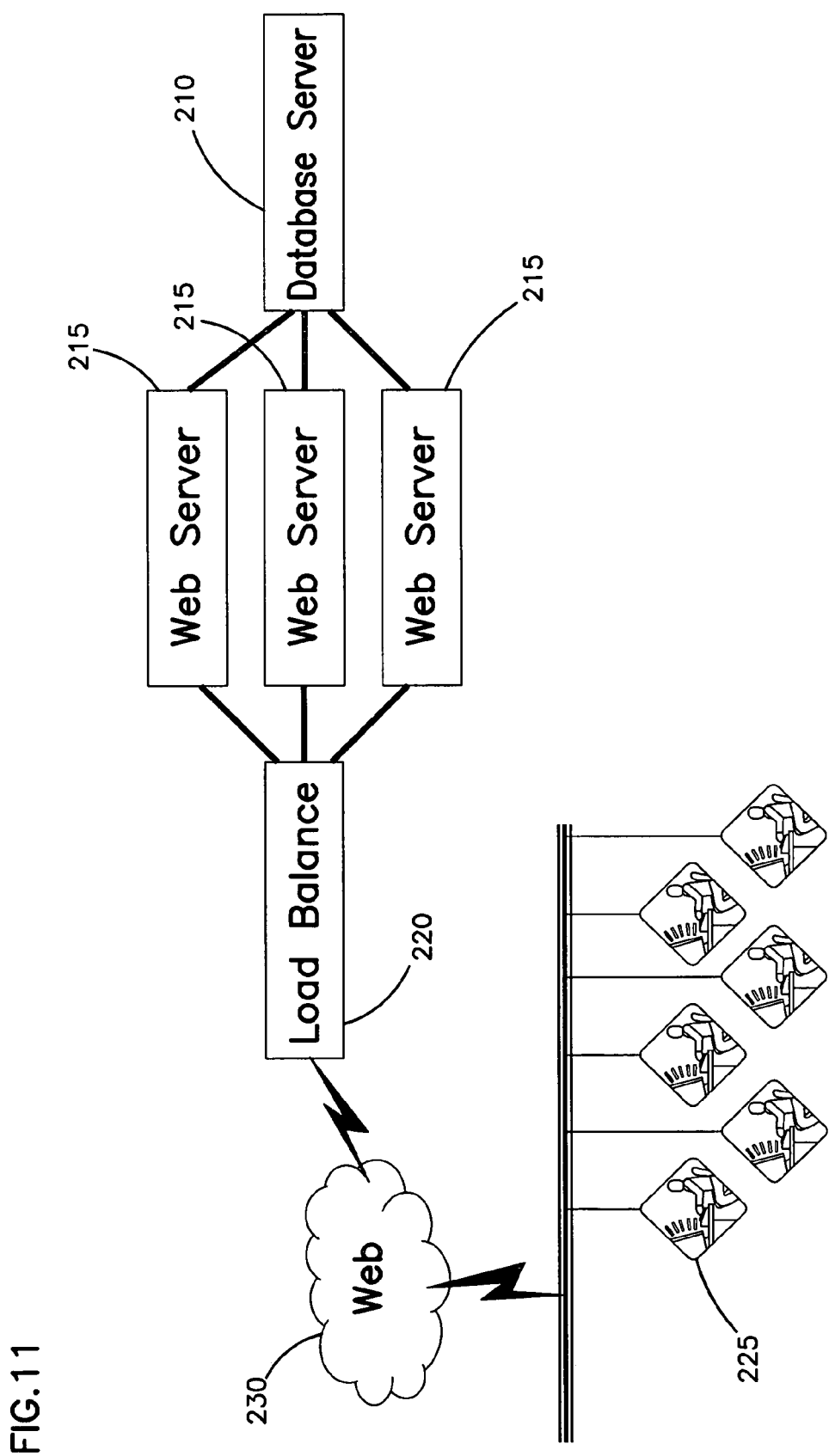
FIG. 11 is a block diagram of a network environment for use with the present system.

An example of an internet delivery system is shown in FIG. 11. Test items are initially stored on a database server 210. The test items are transferred to one or more web servers 215 before a test is administered. A hardware or software load balance system 220 manages data transfer from the web server 215 to a workstation 225 connected to the internet, for example through the world wide web 230. The load balance device allows the system to be scaled up by using multiple web servers to meet load demands. To reduce load demands, test items may be stored and transferred in four-bit color, making 16 colors available for test presentation.

One advantage that may be achieved by the present system is allowing a wider variety of fonts to be more easily used in electronic testing. Because the text is eventually captured and presented in an image format, the test content author is free to choose from the fonts available in the authoring software. The author can do this without concern about what fonts are available to the delivery system or on the examinee's workstation. A variety of character sets, as well as fonts for bold, italics, underline, subscript, superscript, are all equally deliverable.

The method of the present system typically affords greater flexibility to test authors because any symbol that is available to the author normally can be represented as an image. For example, some authoring tools such as MICROSOFT® WORD™ software support tools for easily building formulas. Any equation or formula will be captured in image format exactly as it is built in the authoring tool. Therefore, math equations, formulas and special symbols may be used regardless of the delivery system or the examinee's system. FIGS. 2 and 3, for example, use a square root symbol. Other examples include use of the Pi symbol on a math test or the ¿symbol on a Spanish language test.

Another advantage that may be provided by the present invention is uniformity in the alignment of the test item content. Some test administers demand that certain alignment rules apply to the text in the item stem and/or item distracters. A typical example of this is vertical decimal alignment for math item distracters. Many authoring tools support various alignment features. With item image capture of the present invention, the most convenient authoring tool may be used to achieve the desired alignment. The capture of an image of the test content ensures that the desired alignment is retained. As shown in FIG. 4, the numerical responses (28, 128, 152, 168) are vertically aligned at the decimal point.

The image capture method of the present system may also facilitate administration of multi-language tests. For example, because a captured test item image will exactly represent the item as authored, alphabetical and grammatical variations among languages will not affect or disrupt presentation of multi-language tests.

Another potential advantage of the image capture method of the present system concerns window scrolling. When the item content is captured and presented as a test item image, it is possible to control the amount of screen space occupied by the test item and the amount of window scrolling required to view the entire test item. By specifying the exact dimensions of the display panel in pixels, the delivery system can ensure that all examinees can see the same amount of content and must perform the same amount of scrolling to view the entire test item.

Another potential advantage of the test item display method of the present system concerns test security. In a standardized test, it is important to prevent test takers from copying portions of the exam and distributing the content to future test takers. For example, most delivery text-based delivery formats permit the test taker to use text-editing functions to "cut" and "paste" text from one document to another. If test content can be easily 'cut' and later pasted into another application, test security could be compromised by unscrupulous test takers who use text-editing functions to copy portions of a standardized exam. Under the method of the present system, because test content is presented in an image format rather than text format, the test content may less susceptible to copying by text-based cut and paste functions. As a result, the test content may be more secure against unauthorized reproduction.

Throughout the invention, reference has been made to the electronic testing context where test items are delivered to test takers at computer workstations. However, the display techniques of the present invention may also be employed in other contexts for data other than test items where consistent display is important. For example, the display techniques of this system may also be used for survey questions for electronic survey administration of survey items, electronic administration of customer satisfaction questionnaires including question items or other data presentation and gathering contexts.

The above specification, examples and data provide a complete description of the manufacture and use of the composition of the invention. Since many embodiments of the invention can be made without departing from the spirit and scope of the invention, the invention resides in the appended claims.

We claim:

1. A method for uniformly displaying a test item on a first display device and a second display device the method comprising the steps of:
   storing test content in a memory system, the test content including at least a question portion and a response portion;
   capturing at least a portion of the test content in a test item image, the test item image including at least the question portion and the response portion;
   overlaying a response control over the test item image, the test item image and response control together defining a test item;
   presenting the test item to the respondent in a first panel on the first display device, the first display device having a first resolution, the first panel including a number of pixels in a first and a second direction, wherein additional pixels may be viewed by scrolling subject matter through the panel;
   presenting the test item to the respondent in a second panel on a second display device, the second display device having a second resolution different from the first resolution, the second panel including substantially the same number of pixels in a first direction as the first panel and including substantially the same number of pixels in a second direction as the first panel;
   wherein substantially the same amount of scrolling is required to view the question portion in the panel on the first display device and on the second display device despite the different resolutions of the first and second display devices.

2. The method of claim 1 further comprising the step of receiving through the first workstation a response electronically generated by the respondent.

3. The method of claim 1 wherein the step of storing the test content further comprises positioning in at least one file the question portion, the response portion and an illustration portion.

4. The method of claim 1 wherein the step of capturing comprises printing and then electronically scanning the test content.

5. The method of claim 1 wherein the step of capturing comprises electronically capturing the test item image from an electronic file containing the test content.

6. The method of claim 1 wherein the storing step includes storing test content that includes a text portion and an illustration portion.

7. The method of claim 1 further comprising overlaying a navigation control that is presented to the respondent for enabling the respondent to navigate forward or backward to other test items.

8. The method of claim 1 wherein the response control comprises at least one device for selecting one of a plurality of response options.

9. The method of claim 1 wherein the response control is selected from a group consisting of a radio box, a check box, a text box, an electronic drawing box, a drop and drag overlay, and a hot spot overlay.

10. The method of claim 1 wherein a plurality of question portions and response portions are captured in a single test item image.

11. A method for electronically displaying a test item to a respondent in a consistent manner on a first workstation display having a first display resolution and at least one other workstation display having a display resolution different than the first display resolution, the method comprising the steps of:
    displaying a question portion in an image format in a panel, wherein the panel includes a defined number of pixels in each direction, and wherein additional pixels may be viewed by scrolling subject matter through the panel, and wherein the same amount of scrolling is required to view the question portion in the panel on the first workstation display device and the other workstation display device, despite the different display resolutions; and
    displaying a response control overlaid on the question portion.

12. A method for electronically displaying a test item to a respondent in a consistent manner on a first workstation display configuration and at least one other display configuration different than the configuration of the first workstation display, the method comprising the steps of:
    displaying a first test item on a first display having a first resolution, the first item being displayed in a panel having vertical and horizontal parameters defined in pixels, the first test item comprising an image of test content and an overlaid response control; and
    displaying the first test item on a second display having a second resolution larger than the first resolution, the first item being displayed in a panel having vertical and horizontal parameters that are substantially the same as the parameters used to display the item on the first device, wherein substantially the same amount of scrolling is needed to display the first test item on the first display and on the second display.

13. The method of claim 12 wherein the first test item appears the same size on the first display and the second display.

14. A method for electronically displaying a test item to a respondent at a workstation in a consistent manner for a plurality of different workstation configurations, the method comprising the steps of:
    providing an image including at least one question portion and one response portion;
    overlaying a response control over the image to form a test item;

displaying the test item to a first respondent on a first workstation having a first display with a first resolution; and displaying the test item to a second respondent on a second workstation having a second display with a second resolution, the first resolution being higher than the second resolution, wherein the same amount of scrolling is required to view the test item on the first display and the second display.

15. The method of claim 14 wherein the first display and the second display each define a viewing area and the viewing areas are approximately equal.

16. The method of claim 14 wherein the test items appear the same size on the first display and the second display.

17. The method of claim 14 wherein the response control comprises at least one device for selecting one of a plurality of response options.

18. The method of claim 14 wherein the response control is selected from a group consisting of a radio box, a check box, a text box, an electronic drawing box, a drop and drag overlay, and a hot spot overlay.

19. The method of claim 14 further comprising overlaying a navigation control which is presented to the respondent to enable the respondent to navigate forward or backward to other test items.

20. The method of claim 14 further comprising overlaying a graphic tool that is positionable over portions of the test item.

21. The method of claim 20 wherein the graphic tool is selected from a group consisting of a ruler and a protractor.

22. A method for electronically displaying a test item to a respondent at a first workstation having a display device, the method comprising the steps of:

storing test content in a memory system, the test content including at least a question portion and a response portion;

capturing at least a portion of the test content in a test item image;

presenting the test item image to the respondent at the first workstation in a panel using a predetermined number of pixels and a predetermined aspect ratio; and overlaying a response control over the test item image, the test item image and response control together defining a test item;

wherein a substantially uniform amount of scrolling is required to view the test item, regardless of the parameters of the display device.

23. The method of claim 22 wherein all information provided to the respondent is provided in an image-based format.

\* \* \* \* \*